United States Patent Office 3,597,239
Patented Aug. 3, 1971

3,597,239
METHOD OF MANUFACTURING FROZEN OIL-BLANCHED DICED POTATOES SUITABLE FOR PREPARING HASH BROWN POTATOES
Frederick H. Vahlsing, Jr., Allentown, N.J., assignor to Vahlsing, Inc.
No Drawing. Filed Sept. 25, 1967, Ser. No. 670,407
Int. Cl. A23b 7/06
U.S. Cl. 99—193                               2 Claims

ABSTRACT OF THE DISCLOSURE

Frozen oil-blanched diced potatoes are made by cutting pre-cooked, pre-fried, frozen potato pieces of relatively large size into smaller-sized segments to eliminate agglomeration problems in the manufacturing process and to enhance the taste and appearance qualities of the product when reheated or fried for consumption.

---

This invention relates to manufacture of frozen oil-blanched diced potatoes having materially improved taste and appearance when reheated or fried for consumption.

One popular way of serving potatoes comprises so-called "hash brown" potatoes, which are prepared generally by pan-frying small potato pieces which have been pre-cooked in water. The preparation of fresh hash brown potatoes from raw potatoes is inconvenient and tedious, since it necessarily involves at least two different cooking operations and a cutting operation. The commercial potato processing industry has heretofore attempted to supply a product which might be more conveniently used by the consumer to prepare hash brown potatoes. This commercial product is generally called frozen hash brown potatoes and generally comprises small pieces of potatoes, each having a maximum linear dimension of about ½ inch, which have been pre-cooked in water and frozen. However, this commercial product suffers from several serious drawbacks in that it cannot be manufactured nor finish-prepared by the consumer without technical difficulties, and as a result when re-heated or fried the product lacks uniformity and pleasing texture and taste.

In the conventional process for manufacturing frozen hash brown potatoes, whole potatoes are cleaned and peeled and then cut into the smaller sizes mentioned above. The small pieces are then pre-cooked in water, after which excess water is removed, and the pieces are finally frozen and packaged.

This process suffers from the fact that after the small potato pieces have been cooked in water, it is very difficult to remove excess water from the pieces and to maintain them as separate discrete pieces. The reason for this is that the cooking process gelatinizes the starch in the potato and therefore the potato pieces develop adhesiveness in their surfaces and tend to strongly clump or agglomerate together. A common practice is to shake these clumps or agglomerates upon a vibrating screen in order to break them up and liberate the individual pieces. However, the shaking operation is not very efficient and many clumps or agglomerates remain in the product. Also, the shaking operation is wasteful because any pieces of potato which have broken into even smaller pieces fall through the shaking screen along with the water being removed and this amount of lost potato solids is not generally recoverable.

One might assume that such a problem could be overcome by first cooking the potatoes and then cutting the cooked potatoes rather than the converse. This is not feasible since it is virtually impossible to cut whole, cooked potatoes into the small sizes required for the diced product without causing even greater clumping or agglomerating.

A further drawback of the conventional diced product is that it must be thoroughly fried in oil in order to give the product the desired hash brown quality. However, this is very difficult since, first of all, the frozen product has a moisture content which often causes the pieces to stick to the frying surface as it is released during the thawing and frying steps which are necessary to prepare the product for consumption. Moreover, it is extremely difficult to uniformly fry the very large total surface area of the small pieces and in actual practice the potato pieces must be stirred and turned over frequently in the pan for a long cooking time to achieve something which only approaches uniformity, without charring pieces by allowing them to rest on the hot pan surface for too long. These problems have prevented the potato processing industry from supplying a potato product which enjoys widespread acceptance in both the home consumer and institutional markets as an advantageous means for preparation of hash brown potatoes.

I have now discovered a simple and effective method by which the problems noted above are avoided and, moreover, material improvements are achieved in the final taste and appearance qualities of hash brown potatoes when prepared from the new potato product that is provided by my method. More particularly, I have found that potato pieces which have been pre-cooked, pre-fried and frozen may be readily cut into small-sized diced segments without any of the clumping or agglomerating problems that are now encountered in the conventional methods. Thus, in my method elongated potato pieces which have been pre-cooked, pre-fried and frozen are chopped or otherwise cut, while still frozen, into small dice-sized segments and then these segments are immediately packaged for sale as frozen diced potatoes. Because the product is cut while in the frozen state, stickiness of the surfaces to each other is eliminated and thereby the clumping and agglomerating problems encountered in conventional practice is overcome. Furthermore, the frozen diced potatoes produced by my method have a fried skin containing evenly-distributed vegetable oil, so that any further impregnation of oil in the product by pan-frying is only optional. Thus, my method provides an entirely new commercial product inasmuch as it is oil-blanched and, if desired, may be merely reheated in an oven to prepare hash brown potatoes for consumption. Also, because this oil-blanch or fried skin is applied to the larger uncut pieces by controlled deep fat frying techniques, the frozen oil-blanched diced potatoes when reheated brown with remarkable uniformity and also have materially improved taste and appearance. Thus, in the frozen diced potato produced by my method, the frying oil which is necessary to give the hash brown quality is put into the product by the commercial manufacturer rather than the end user. This feature overcomes the difficulty of uniformly browning conventional pre-cooked potato pieces and thereby provides substantial benefits and convenience to those who desire to serve hash brown potatoes. Among the most important of these are (1) no clumping or agglomerating in manufacture or package, (2) uniform browning and oil absorption, (3) further browning only optional and (4) shorter cooking time.

The process which may be followed in carrying out the practice of the present invention is illustrated in the accompanying flow sheet. The potatoes are taken through successive steps of cleaning and peeling, cutting into elongated pieces, precooking in water after which the excess water is removed, prefrying in oil and then freezing prior to the novel step of cutting the potatoes into dice size pieces after they are frozen; the food may be stored in the frozen state and then reheated for consumption at a later date.

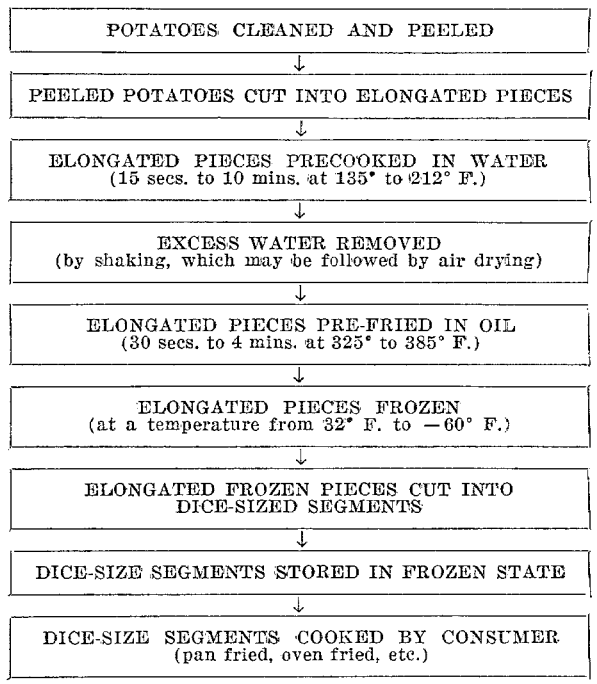

OIL BLANCHED DICED POTATO PREPARATION
(FLOW SHEET)

POTATOES CLEANED AND PEELED
↓
PEELED POTATOES CUT INTO ELONGATED PIECES
↓
ELONGATED PIECES PRECOOKED IN WATER
(15 secs. to 10 mins. at 135° to 212° F.)
↓
EXCESS WATER REMOVED
(by shaking, which may be followed by air drying)
↓
ELONGATED PIECES PRE-FRIED IN OIL
(30 secs. to 4 mins. at 325° to 385° F.)
↓
ELONGATED PIECES FROZEN
(at a temperature from 32° F. to −60° F.)
↓
ELONGATED FROZEN PIECES CUT INTO DICE-SIZED SEGMENTS
↓
DICE-SIZE SEGMENTS STORED IN FROZEN STATE
↓
DICE-SIZE SEGMENTS COOKED BY CONSUMER
(pan fried, oven fried, etc.)

In preparing the frozen oil-blanched diced potatoes of my invention, conventional commercial techniques may be used up to the time of the vital step of cutting the frozen relatively large potato pieces. Accordingly, whole potatoes are cleaned and peeled in conventional manner and then the whole potatoes are cut into elongated pieces which, after being pre-cooked, pre-fried and frozen, are chopped into the diced potatoes in accordance with the invention. If it is desired that the final product be substantially cube-shaped, then the elongated raw pieces cut from the whole potatoes should be controlled to a thickness equivalent to the edge dimension of the desired cube shape. The final diced potato need not be in a cube shape in which case the elongated pieces cut from the whole potatoes may have other thicknesses, and in all cases the thickness may range from 3/16 to 3/4 inch. For convenience, it has been found practical to maintain the length of the elongated pieces within a range from about 1 to 5 inches.

The raw elongated potato pieces are next pre-cooked in water and this may be done by immersing the pieces in water having a temperature from about 135° to 212° F. for about 15 seconds to about 10 minutes. In this step the time of immersion is inversely proportional to the temperature of the water, so that the desired degree of pre-cooking in the potato pieces may be achieved during shorter immersion times with higher cooking water temperatures. Thereafter, excess water is removed from the pre-cooked pieces by shaking them, preferably followed by air drying. The point is that the more the cooked pieces are dried, the easier it is to pre-fry them subsequently.

Accordingly, after the elongated potato pieces have been pre-cooked and dewetted, they are pre-fried by immersing them in a frying oil, preferably of vegetable origin. Generally speaking, the pre-frying can be carried out in oil having a temperature from about 325° to 385° F. and over a time period ranging from about 30 seconds to about 4 minutes. Again, the time of frying varies inversely with the temperature of the frying oil, so that the higher the temperature the shorter will be the time required to effect the desired degree of pre frying. Any of the conventional frying oils may be used for this step of the process, for example, hydrogenated cottonseed oil.

After the excess oil has been shaken off, the pre-cooked, pre-fried, elongated potato pieces are now frozen to prepare them for the cutting operation into dice-size segments. Preferably, the freezing is accomplished in commercial equipment in which the temperature of the potato pieces is reduced very rapidly to within a range below 32° F. and down to about −60° F. After the potato pieces have been frozen, they are cut into small size segments to produce the frozen oil-blanched diced product of the invention. In carrying out this step, conventional machinery may be used to chop the elongated pre-cooked, pre-fried, frozen potato pieces into the desired size of diced segments. Because the elongated pieces are frozen, they are chopped very cleanly and evenly, whereby small-dice-size segments of desired size may be readily manufactured. For use in preparing hash brown potatoes, the elongated pre-cooked, pre-fried, frozen pieces should be cut so as to give small segments each having a maximum linear dimension ranging from 3/16 to 3/4 inch. These size limits represent the maximum and minimum size of diced potato that will be attracted to the consumer as a hash brown product when re-heated or fried. In more commercial embodiments of the invention, the size of the small segments cut from the elongated pieces should be controlled so that the maximum linear dimension of each segment is within the range from 1/4 to 1/2 inch. As previously noted, the segments may be cut into substantially a cube shape, although this is not essential and other shapes may also be used. It will be understood, of course, that in performing the cutting operatioin upon the frozen elongated pieces, the resulting diced segments will not be exactly the same in dimensions but will vary to some extent from the dimension which the cutting or chopping is intended to give.

As previously mentioned, the cut segments may be immediately packaged without further treatment for shipment and sale as frozen oil-blanched diced potatoes suitable for preparation of hash brown potatoes. The consumer of the frozen diced potato may, at his option, prepare the product for consumption by merely reheating the product either in a pan or oven, or the product may be pan-fried in a small quantity of frying oil in order to further brown the skins before it is consumed. If such an additional frying step is carried out, as has been previously explained, there are virtually no problems of achieving uniform browning or sticking to the pan surface since the frozen diced potatoes of this invention are oil-blanched in advance, which overcomes such problems.

While it is not critical or essential, the elongated potato pieces may be pre-cooked and pre-fried according to the invention of my prior U.S. Pat. 3,175,914 to further improve the final textural and taste qualities of the hash brown potatoes that are ultimately made from the frozen oil-blanched diced potatoes of this invention.

As a specific example of the method of this invention, cleaned, peeled, white potatoes were cut into elongated pieces having a substantially square cross-section about 1/2 inch thick and a length about 1 1/2 to 4 inches long. The pieces were pre-cooked by immersing them in water at a temperature of about 170° F. for about three minutes. Thereafter the potatoes were removed from the water, excess of which was shaken off them, and fried for about one minute in hot, hydrogenated cottonseed oil having a temperature of 380° F. The pre-cooked, pre-fried potato pieces were next frozen rapidly to a temperature of about −40° F. The frozen pieces were then chopped into substantially cube-shaped segments of about 1/2 inch in edge dimension. The segments were readily filled into packages without any problems of clumping or agglomerating, and each segment remained discrete and separate from the others. The frozen diced segments were re-heated by pan frying them in a small amount of butter for about 5 to 6 minutes. The resulting hash brown potatoes had an excellent color, uniform fried skins and distribution of absorbed oil, and were attractive and tasty.

It will be understood that it is intended to cover all changes and modifications of the preferred embodiments of the invention herein chosen for the purpose of illustra-

What is claimed is:

1. The method of manufacturing frozen oil-blanched diced potatoes suitable for preparation of hash brown potatoes which comprises:
   (a) cleaning and peeling the potatoes,
   (b) cutting the peeled potatoes into a plurality of potato pieces,
   (c) pre-cooking the said potato pieces by immersing the pieces in water having a temperature from about 135° to 212° F. for about 15 seconds to about 10 minutes,
   (d) removing said potato pieces from the pre-cooking water and removing any excess water which remains on the potato pieces,
   (e) pre-frying the pre-cooked potato pieces in oil by immersing them in an edible frying oil having a temperature from about 325° to about 385° F. for about 30 seconds to about 4 minutes,
   (f) removing the resultant pre-cooked, pre-fried potato pieces from the oil and removing any excess oil which remains on the potato pieces,
   (g) freezing the pre-cooked, pre-fried potato pieces by reducing the temperature thereof to within the range below 32° F. and down to about −60° F.,
   (h) machine cutting the pre-cooked, pre-fried frozen potato pieces into a plurality of smaller-sized segments, and
   (i) packaging the said smaller-sized segments for sale.

2. A method as in claim 1 wherein each said segment has a maximum linear dimension within the range from ¼ to ½ inch.

References Cited

UNITED STATES PATENTS

| | | | |
|---|---|---|---|
| 2,816,037 | 12/1957 | Olsen et al. | 99—192 |
| 2,798,814 | 7/1957 | Rivoche | 99—193X |
| 3,050,404 | 8/1962 | Traisman | 99—193 |
| 3,355,299 | 11/1967 | McLaughlin et al. | 99—100 |
| 3,397,993 | 8/1968 | Strong | 99—193X |
| 3,423,213 | 1/1969 | Vahlsing | 99—193 |
| 2,052,221 | 8/1936 | Dubil | 146—228X |
| 2,836,368 | 5/1958 | McCoy | 146—228X |
| 3,230,094 | 1/1966 | Hilton | 99—100P.UX |

OTHER REFERENCES

"Procurement and Processing of Frozen Potatoes" by R. R. Bohannon Quick Frozen Foods, June 1961, pp. 46–49.

NORMAN YUDKOFF, Primary Examiner

F. E. DRUMMOND, Assistant Examiner

U.S. Cl. X.R.

99—100P, 154, 207